United States Patent [19]

Christensen

[11] 4,021,381

[45] May 3, 1977

[54] INTEGRAL-SKINNED POLYURETHANE FOAM PREPARED IN THE PRESENCE OF A PHOSPHITE OR PHOSPHINE CATALYST

[75] Inventor: Nils J. Christensen, Palatine, Ill.

[73] Assignee: Universal Oil Products Company, Des Plaines, Ill.

[22] Filed: June 9, 1975

[21] Appl. No.: 585,220

Related U.S. Application Data

[63] Continuation-in-part of Ser. No. 358,183, May 7, 1973, abandoned.

[52] U.S. Cl. .................... 260/2.5 AZ; 260/2.5 AB; 260/2.5 AC; 260/2.5 AJ
[51] Int. Cl.² ......................................... C08G 18/16
[58] Field of Search ................ 260/2.5 AZ, 2.5 AJ, 260/2.5 AB, 2.5 AC

[56] References Cited

UNITED STATES PATENTS

| | | |
|---|---|---|
| 3,012,991 | 12/1961 | Schultheis et al. .................. 260/2.5 |
| 3,073,788 | 1/1963 | Hostettler et al. .................. 260/2.5 |
| 3,121,731 | 2/1964 | Quensel et al. ..................... 260/2.5 |
| 3,168,497 | 2/1965 | Twitchett ........................... 260/2.5 |
| 3,208,959 | 9/1965 | Gnutter .............................. 260/2.5 |
| 3,476,835 | 11/1969 | Schwachhofer et al. ........... 260/2.5 |
| 3,674,750 | 7/1972 | Brady ................................. 260/2.5 |
| 3,751,392 | 8/1973 | Olstowski ........................... 260/2.5 |
| 3,775,350 | 11/1973 | Juhas ................................. 260/2.5 |

Primary Examiner—Eugene C. Rzucidlo
Attorney, Agent, or Firm—James R. Hoatson, Jr.; Kimbley L. Muller; William H. Page, II

[57] ABSTRACT

A flame-retardant integral-skinned polyurethane foam is prepared by a method which comprises the reaction of a polyol and an organic polyisocyanate in the presence of a foaming agent comprising trichlorofluoromethane, the improvement which comprises the incorporation of a catalyst comprising a phosphorous-containing compound selected from the group consisting of an alkyl phosphite, aryl phosphites and aryl-, alkyl-, aminoaryl-, alkaryl- and halide phosphines.

12 Claims, No Drawings

INTEGRAL-SKINNED POLYURETHANE FOAM PREPARED IN THE PRESENCE OF A PHOSPHITE OR PHOSPHINE CATALYST

CROSS-REFERENCE TO RELATED APPLICATION

This application is a continuation-in-part of my earlier U.S. application Ser. No. 358,183 filed May 7, 1973, now abandoned and incorporates by reference every teaching therein.

This invention relates to the utilization of certain catalytic compositions of matter in a method for preparing an integral-skinned polyurethane foam. More specifically, this invention relates to the utilization of certain catalytic compositions of matter comprising a phosphorous-containing compound selected from the group consisting of an alkyl phosphite, aryl phosphite and an aryl-, alkyl-, aminoalkyl-, aminoaryl-, alkaryl- and halide phosphine to produce a flame-retardant integral-skinned polyurethane foam in a reaction of a polyol with an organic polyisocyanate in the presence of a foaming agent.

The utilization of various compounds for the formation of flame retardant polyurethanes is well known in the art. The reaction of a polyol with an organic polyisocyanate in the presence of a foaming agent is well known in the polyurethane foam formation. In U.S. Pat. No. 3,803,064 a flame-retardant polyurethane foam was obtained by the reaction of a toluene diisocyanate with a polymeric polyol in the presence of a substance which is effective for the polymerization of the toluene diisocyanate and an anti-aging additive such as a halogenated aliphatic phosphate to impart flame-retardant properties. In U.S. Pat. No. 3,856,716 it was disclosed that a flexible high density polyurethane foam can be prepared by the quasi-prepolymerization of a prepolymer composition which is obtained from a diisocyanate and a copolymer of an ε-caprolactone, an epoxide and a monomeric diol chain initiator, where said quasi-polymerized compound is reacted with a copolymer and monomeric diol mixture. Further, in U.S. Pat. No. 3,865,761 a flame retardant polyurethane foam as prepared from the reaction of a polyol, an organic polyisocyanate, a foaming agent, a reaction catalyst and a flame-retardant amount of a halogenated aromatic carbamate is taught.

In contradistinction to the prior art, it has now been discovered that a novel flame-retardant polyurethane foam may be prepared by the reaction of a polyol with an organic polyisocyanate in the presence of a foaming agent and a catalyst and flame-retardant inducing substance comprising a phosphorous-containing compound selected from the group consisting of an alkyl phosphite, an aryl phosphite, and aryl-, alkyl-, aminoalkyl-, aminoaryl-, alkaryl- and halide phosphine. The method of this invention will create the induction of desirable flame-retardant physical properties to an integral-skinned polyurethane foam. It is also contemplated that the flame-retardant polyurethane foam upon hardening will contain greater physical properties of impact resistance, compressive strength and insulation qualities than normally would have been expected in the utilization of a compound which functions both as a catalyst and a flame-retardant donor (i.e. a phosphorous-containing compound). The utilization of the above set forth invention will also permit the manufacturer of polyurethane foams a less expensive method of preparation as a result of the utilization of the phosphorous-containing compound as a bifunctional element, one function being to catalyze the reaction of the polyol with the polyisocyanate and the second function being the induction of flame retardant properties without a depreciation in the other physical properties such as impact resistance, compressive strength and insulation quality.

Integral-skinned polyurethane foams are utilized in the chemical industry in many ways. For example integral-skinned polyurethane foams can be used as materials in the manufacturing of cushions, insulators, airplane seats that will also serve as life preservers, airline galleys, decorator panels, furniture, coating material, etc. One specific use within the contemplation of this invention is the utilization of the integral-skinned polyurethane for the interior of mass-transit vehicles in which the integral-skinned polyurethane foam is formed with a halogenated phosphine thereby creating a product with is flame resistant and self-extinguishing. Such a material would add an extra safety variable to mass-transit travel especially airline travel, while not creating an overall increase in the cost of travel.

It is therefore an object of this invention to provide a catalyst and physical-property inducing material for the improvement of a method for the reaction of a polyol with an organic polyisocyanate in the presence of a foaming agent.

It is a further object of this invention to provide a method for the preparation of an integral-skinned polyurethane foam utilizing certain catalytic compositions of matter which will permit reaction rates and greater physical properties of the resultant integral-skinned polyurethane foam without creating any excess problems in the recovery of the desired integral-skinned polyurethane foam.

In one aspect an embodiment of this invention resides in a method for the preparation of an integral-skinned polyurethane foam which comprises the reaction of a polyol with an organic polyisocyanate in the presence of a foaming agent the improvement which comprises the incorporation in the integral-skinned polyurethane foam of a catalyst comprising a phosphorous-containing compound selected from the group consisting of an alkyl phosphite, an aryl phosphite and an aryl-, alkyl-, aminoalkyl-, aminoaryl-, alkaryl-, and halide phosphine at a temperature of from about 60° F. to about 200° F. and a pressure of from about 1 to about 5 atmospheres.

A specific embodiment of this invention resides in a method for preparing an integral-skinned polyurethane foam, said method being effected by reacting a polyoxypropylene derivative of pentaerythritol possessing a hydroxyl number of 560 with a polymethylenepolyphenylisocyanate possessing an isocyanate equivalent of 133 and NCO content by weight of 32% in the presence of trichlorofluoromethane as the foaming agent and a composition of matter which comprises triphenylphosphite at a temperature in the range of from about 60° F. to about 200° F. and a pressure in the range of from 1 to about 5 atmospheres.

Other objects and embodiments will be found in the following further detailed description of the present invention.

As hereinbefore set forth, the present invention is concerned with a method for the preparation of an integral-skinned polyurethane foam which is formed from the reaction of a polyol with an organic polyisocyanate in the presence of a foaming agent, said method being effected in the presence of certain catalytic compositions of matter. The method is effected under reaction conditions which include an elevated temperature of from about 60° F. to about 200° F. and preferably in the range of from about 70° F. to about 120° F. In addition, another reaction condition involves pressure, said autogeneous pressures ranging from atmospheric up to 5 atmospheres or more. When higher pressures are employed, the pressure may be afforded by the introduction of a substantially inert gas to the reaction zone such as nitrogen, helium, argon, etc., of which nitrogen is preferred.

The polyol composition of matter of the present invention which is known to the art will comprise polyols such as diols, triols, or polyether polyols in which the polyols contain a substantial proportion of primary hydroxyl end groups usually referred to as ethylene oxide-tip polyols. Suitable examples of desired polyols may be defined by their relative hydroxy number which in the method of this invention will range from about 25 to about 800. Suitable examples of polyols which may be used in the process of this invention will include polyoxypropylene derivatives of pentaerythritol possessing a hydroxy number of 555, a polyoxypropylene derivative of pentaerythritol possessing a hydroxy number of 450, a polyoxypropylene derivative of pentaerythritol possessing a hydroxy number of 378, an amine-based polyolpolyether possessing a hydroxy number of 453, an amine-based polyolpolyether possessing a hydroxy number of 450, a polyoxypropylene derivative of methyl glucoside possessing a hydroxy number of 525, a polyoxypropylene derivative of methyl glucoside possessing a hydroxy number of 440, a polyoxypropylene derivative of sucrose possessing a hydroxy number of 570, a polyoxypropylene derivative of sucrose possessing a hydroxy number of 500, a polyoxypropylene derivative of trimethylolpropane posessing a hydroxy number of 230, a polyoxypropylene derivative of trimethylolpropane possessing a hydroxy number of 397, a polyoxypropylene derivative of trimethylolpropane possessing a hydroxy number of 561, a polyoxypropylene derivative of propylene glycol possessing a hydroxy number of 265, aromaticbased polyoxypropylene derivatives of propylene glycolpolyols possessing a hydroxy number of 390 or 347, polyether sorbitol possessing a hydroxy number of 490, polyether sorbitol possessing a hydroxy number of 310, polyether sorbitol possessing a hydroxy number of 380, polyether sorbitol possessing a hydroxy number of 412, propylene oxide of hexitol possessing a hydroxy number of 640, propylene oxide of hexitol possessing a hydroxy number of 555, propylene oxide of hexitol possessing hydroxy number of 490, 1,4-butanediol, 1,2-butanediol, 1,5-hexanediol, 1,3,5-pentanetriol, 1,6-hexanediol, glycerol, trimethylolpropane, a mixture thereof such as a mixture comprising a polyoxypropylene derivative of pentaerythritol possessing a hydroxy number of 450, a polyoxypropylene derivative of pentaerythritol possessing a hydroxy number of 650, a polyoxypropylene derivative of pentaerythritol possessing a hydroxy number of 434 and a polyoxypropylene derivative of pentaerythritol possessing a hydroxy number of 740, etc.

Examples of suitable organic polyisocyanates which may be reacted with the aforementioned polyols will include such diisocyanates as the polymethylene polyphenylisocyanates as exemplified by PAPI as available from Uphjohn Co. and Mondur MRS as available from Mobay Chemical Co. or other known organic polyisocyanates comprising ethylene diisocyanate, trimethylene diisocyanate, tetramethylene diisocyanate, pentamethylene diisocyanate, or hexamethylene diisocyanate as exemplified in U.S. Pat. No. 3,857,802 as well as propylene-1,2-diisocyanate, butylene-1,2-diisocyanate, butylene-1,3-diisocyanate, butylene-2,3-diisocyanate; alkylidene diisocyanates such as ethylidene diisocyanate and butylidene diisocyanate; cycloalkylene diisocyanates such as cyclopentylene-1,3-diisocyanate, cyclohexylene-1,2-diisocyanate, cyclohexylene-1,3-diisocyanate and cycloalkylidene diisocyanates such as cyclopentylidene diisocyanate and cyclohexylidene diisocyanate, aromatic diisocyanates such as m-phenylene diisocyanate, p-phenylene diisocyanate, 2.4-toluene diisocyanate, 2,6-toluene diisocyanate, bitolylene diisocyanate, naphthalene-1,4-diisocyanate, and diphenylene-4,4'-diisocyanate, aliphatic-aromatic diisocyanates such as xylylene-1,4-diisocyanate, xylylene-1,3-diisocyanate, bio(4-isocyanatophenyl)methane, etc. The quantity of isocyanate compounds which may be employed in comparison to the polyol composition is expressed in terms of NCO index. The NCO index is defined as the ratio of NCO to hydroxyl (OH) groups times 100. The preferred range of NCO index is from about 0.9 NCO groups to about 1.25 NCO groups per hydroxyl group.

The foaming agent of the present invention will comprise any known foaming agent such as monofluorotrichloromethane, dichloromonofluoromethane, difluorodichloromethane, 1,1,2-trichloro-1,2,2-trifluoroethane, dichlorotetrafluoroethane, ethyl chloride and methylene chloride. The weight percentage of the foaming compound is present in a weight percentage as desired by the degree of surface area of the resultant integral-skinned polyurethane foam and such weight percentages would be known to one skilled in the art of polyurethane foam formation.

It is also contemplated within the scope of this invention that minor amounts of conventional surfactants may be employed to further improve the polyurethane's cell formation. Typical surfactants may be exemplified by silicones and siloxaneoxyalkylene block copolymers. U.S. Pat. No. 2,834,748 and T. H. Ferrigno, *Rigid Plastic Foams*, pages 38–42 disclose various surfactants which may be utilized within the scope of this invention. The preferred quantity of surfactant material will range from about 1 part surfactant to about 5 parts of surfactant per 100 parts of polyol.

The novel catalytic composition of the present invention will comprise a phosphorous-containing compound selected from the group consisting of a alkyl phosphite, an aryl phosphite, and an aryl-, alkyl-, aminoalkyl-, aminoaryl-, alkaryl-, and halide phosphine. It should be noted that the phosphorous-containing compound acts in a bifunctional capacity. The phosphorous-containing compound acts as a catalyst for the reaction of a polyol with a polyisocyanate in the presence of the foaming agent and simultaneously will function as an agent to impart flame-retardant physical characteristics to the final integral-skinned polyurethane foam. Suitable examples of alkyl phosphite compounds which may be utilized in the present invention will include any alkyl phosphite possessing alkyl substituents of from a carbon number of 1 to about a carbon number of 10 such as trimethylphosphite, triethylphosphite, tripropylphosphite, tributylphosphite, tripentylphosphite, trihexylphosphite, triheptylphosphite, trioctylphosphite, trinonylphosphite, tridecylphosphite, etc. Suitable examples of aryl phosphites will include all mono- and polynuclear aromatic trisubstituted phosphites such as triphenylphosphite, trinaphthylphosphite, etc. Suitable examples of alkyl phosphines which may be utilized in the present invention will include any trialkyl substituted phosphine possessing a carbon number of from about 1 to about 10 such as trimethylphosphine, triethylphosphine, tripropylphosphine, tributylphosphine, tripentylphosphine, trihexylphosphine, triheptylphosphine, trioctylphosphine, trinonylphosphine, tridecylphosphine, etc. Suitable examples of aminoalkylphosphines will include any aminoalkylphosphine containing a hydrogen, aryl or an alkyl substituent of from a carbon number of 1 to a carbon number of 10 substituted upon the two open positions of the amino moiety and an alkyl substitution of from 1 carbon atom to 10 carbon atoms on the phosphine moiety such as diethylaminomethylphosphine, dimethylaminoethylphosphine, dibutylaminomethylphosphine, dipentylaminomethylphosphine, dihexylaminophenylphosphine, dioctylaminoethylphosphine, dinonylaminophenylphosphine, dihexylaminohexylphosphine, diethylaminodecylphosphine, etc. Suitable examples of aminoarylphosphines will include any aminoarylphosphine on which the nitrogen moiety is substituted with 1 or 2 aryl or polynuclear substituents and the phosphorous moiety is substituted with an alkyl, hydrogen or aryl substituent such as diphenylaminomethylphosphine, diphenylaminoethylphosphine, diphenylaminophenylphosphine, diphenylaminoethylphosphine, diphenylaminomethylphosphine, diphenylaminopentylphosphine, phenylnaphthylaminophenylphosphine, dinaphthylaminoethylphosphine, etc. The alkaryl phosphine may be exemplified by any trialkaryl phosphine in which the phosphine moiety is substituted by an aryl compound which is in turn substituted by an alkyl compound such as triethylphenylphosphine, trimethylphenylphosphine, tributylphenylphosphine, tri(ethylphenyl)phosphine, tri(n-octylphenyl)phosphine, etc. The halide phosphine may be exemplified by any halogen substituted phosphine such as trichlorophosphine, tribromophosphine, triiodophosphine, trifluorophosphine, dichlorobromophosphine, dichloroiodophosphine, dibromoiodophosphine, bromoiodofluorophosphine, chloroiodofluorophosphine, etc. It is to be noted that the aforementioned polyols, organic polyisocyanates, foaming agents, alkyl phosphites, aryl phosphites, aryl phosphines, alkyl phosphines, aminoalkyl phosphines, aminoaryl phosphines, alkaryl phosphines, and halide phosphines are only representative of the class of compounds which may be employed and that the present invention is not limited thereto. The novel phosphorous-containing catalytic compound of the present invention may be present in an amount of from about 1.3 to about 2.6 parts per catalyst per 100 parts of the polyol present in the reaction of the polyol with the organic polyisocyanate.

The process of this invention may be effected in any suitable manner and may comprise either a batch or a continuous type operation. For example, when a batch type operation is employed the reactants comprising the polyol and the organic polyisocyanate are placed in an appropriate apparatus along with a foaming agent and a catalyst selected from the group consisting of an alkyl phosphite, an aryl phosphite, and an aryl-, alkyl, aminoalkyl-, aminoaryl-, alkaryl-, and halide phosphine. If atmospheric pressure is to be employed, the reaction vessel is heated to a predetermined operating temperature. After maintaining the reactants and catalysts in the reaction vessel at the predetermined operating temperature for a reaction time which may range from 0.1 hours to about 48 hours or more in duration, the heating is terminated and the vessel allowed to return to room temperature, at which time the integral-skinned polyurethane foam is removed from the mold. It should be noted that while the added novel catalytic phosphorous composition of matter does not become chemically incorporated in the reaction of the polyol with the organic polyisocyanate, however, it is physically incorporated into the polyurethane reaction product thereby imparting flame-retardant properties to the latter.

The following examples are given to illustrate the process of the present invention which, however, are not intended to limit the generally broad scope of the present invention in strict accordance therewith.

EXAMPLE I

In this example 70.0 grams of a polyoxypropylene derivative of pentaerythritol possessing a hydroxy number of 560, 1.4 grams of a silicone surfactant, commonly known as SF-1158, a dimethyl polysiloxane-polyethylene oxide copolymer obtained from the General Electric Co., and 10.0 grams of trichlorofluoromethane were mixed with 1.8 grams of diethylaminomethylphosphine in a vessel. Subsequent to said mixing, 99.0 grams of a polymethylene polyphenylisocyanate possessing an isocyanate equivalent of 133 and an NCO index of 1.05 were added to the vessel. The contents of the vessel were stirred vigorously for 12 seconds at ambient temperature and pressure with an automatic mixer. After a period of time comprising 60 seconds, the contents of the vessel went through a cream stage and the gel cycle was completed after an additional 4 minutes. The foam was allowed to harden to a semi-rigid foam and subsequently to a rigid foam in approximately 10 minutes. The final product exhibited a thick, uniform skin with a semi-rigid cellular urethane core. After air curing, the product exhibited superior impact resistance and compressive strength as determined at the ASTM test for compressive strength, ASTM Test No. D-1621-64T. The sample was further tested for flammability by ASTM Test No. D-1692-67T, said test indicated the sample was non-flammable (flame-retardant).

EXAMPLE II

In this example 70.0 grams of polyoxypropylene derivative of pentaerythritol possessing a hydroxy number of 560, 1.4 grams of a silicone surfactant commonly known as a SF-1158, a dimethyl polysiloxane-polyethylene oxide copolymer obtained from the General Electric Co. and 10.0 grams of trichlorofluoromethane were mixed with 1.8 grams of triphenylphosphite in a vessel. Subsequent to said mixing, 99.0 grams of polymethylene polyphenylisocyanate possessing an isocyanate equivalent of 133 and an NCO index of 1.05 were added to the vessel. The contents of the vessel were stirred vigorously for a period of time comprising 12 seconds and subsequently poured into a preheated mold at a temperature of 90° to 100° F. After a period of time comprising 100 seconds, the contents of the vessel went through the cream stage and the gel cycle was completed after approximately an additional 3 minutes. The foam was allowed to harden to a semi-rigid foam and subsequently to a rigid foam in a period of time comprising approximately 10 minutes. The final product exhibited a thick, uniform skin with a semi-rigid cellular urethane core. After air curing, the product exhibited superior impact resistance and compressive strength as determined by the ASTM Test for compressive strength, ASTM Test No. D-1621-64T. Upon ignition with a flame, the product was found to be self-extinguishing as determined by the flame retardancy test for flammability, ASTM Test No. D-1692-67T.

EXAMPLE III

In this example 100 grams of a mixture comprising polyols in the parts per hundred as set forth in Table I below, 3.0 grams of a silicone surfactant and 20.0 grams of methylene chloride are mixed with 2.0 grams of [di-n-octyl]phenylphosphine in an appropriate reaction vessel.

TABLE I

| Polyol | Parts Per Hundred |
| --- | --- |
| A polyoxypropylene derivative of pentaerythritol of hydroxy number of 555 | 50 |
| A polyoxypropylene derivative of pentaerythritol of hydroxy number of 380 | 15 |
| An aromatic-based polyoxypropylene derivative of propylene glycol of hydroxy number of 390 | 10 |
| 1,4-butanediol of hydroxy number of 1250 | 25 |
| | 100 |

One hundred seventy one grams (171) of a polymethylene polyphenylisocyanate possessing an isocyanate equivalent of 133 and an NCO index of 1.05 are added to the reaction vessel over a period of time comprising 10 seconds with constant stirring of the reaction mixture. The vessel is maintained at reaction conditions of 200° F. and a pressure of 5 atmospheres as afforded by the introduction of nitrogen gas to the reaction system. After a period of time comprising 15 minutes, the reaction vessel is allowed to return to room temperature and pressure as a result of the termination of the heat and venting of the reaction vessel. The reaction product is removed from the reaction vessel and found to be an integral-skinned polyurethane foam which is self-extinguishing. The integral-skinned polyurethane foam is also tested and found to possess good properties of impact resistance, compression strength and insulation.

EXAMPLE IV

In this example, 100 grams of a polyol mixture comprising the various polyols set forth in Table II below, 4.5 grams of silicone surfactant and 15.0 grams of trichlorofluoromethane are mixed with 2.6 grams of trichlorophosphine in an appropriate reaction vessel.

TABLE II

| Polyol | Parts Per Hundred |
| --- | --- |
| A polyoxypropylene derivative of pentaerythritol of hydroxy number of 555 | 40 |
| A polyoxyropylene derivative of pentaerythritol of hydroxy number 380 | 10 |
| An aromatic-based polyoxypropylene derivative of propylene glycol of hydroxy number of 390 | 10 |
| A polyoxypropylene derivative of trimethylolpropane of hydroxy number of 230 | 40 |
| | 100 |

Ninety-eight grams (98.0) of a polymethylene polyphenylisocyanate possessing an isocyanate equivalent of 133 and an NCO index of 1.05 are added to the reaction vessel over a period of time comprising 12 seconds with intimate stirring of the reaction mixture. The vessel is maintained at reaction conditions of 155° F. and a pressure of 1 atmosphere. After a period of time comprising 23 minutes, the reaction vessel is allowed to return to room temperature as a result of the termination of heat to the reaction vessel. The reaction product is removed from the reaction vessel and found to be an integral-skinned polyurethane foam which is self-extinguishing.

I claim as my invention:

1. In a method for the preparation of an integral-skinned polyurethane foam which comprises the reaction of a polyol and an organic polyisocyanate in the presence of a foaming agent, the improvement which comprises the incorporation into the reaction mixture of a catalytic amount of a catalyst comprising a phosphorous-containing compound selected from the group consisting of an alkylphosphite, an aryl-phosphite and an aryl-, alkyl-, aminoalkyl-, aminoaryl-, alkaryl- and halide phosphine at a temperature of from 60 ° F. to about 200° F. and a pressure of about 1 to about 5 atmospheres.

2. The method of claim 1 further characterized in that the phosphorous-containing compound is present in an amount of from about 1.3 to about 2.6 parts of the catalyst per hundred parts of the polyol.

3. The method of claim 1 further characterized in that the phosphorous-containing compound is diethylaminomethylphosphine.

4. The method of claim 1 further characterized in that the phosphorous-containing compound is triphenylphosphite.

5. The method of claim 1 further characterized in that the phosphorous-containing compound is [di-n-octyl]phenylphosphine.

6. The method of claim 1 further characterized in that the phosphorous-containing compound is triethylphosphite.

7. The method of claim 1 further characterized in that the phosphorous-containing compound is trichlorophosphine.

8. The method of claim 1 further characterized in that the polyol is a polyoxypropylene derivative of pentaerythritol possessing a hydroxy number of 560, the organic polyisocyante is polymethylene polyphenylisocyanate possessing an isocyanate equivalent of 133 and the foaming agent is trichlorofluoromethane.

9. The method of claim 1 further characterized in that the polyol is a polyoxypropylene derivative of trimethylolpropane possessing a hydroxy number of 230, the organic polyisocyanate is polymethylene polyphenylisocyanate possessing an isocyanate equivalent of 133 and the foaming agent is trifluorochloromethane.

10. The method of claim 1 further characterized in that the polyol is present as a mixture of different polyols.

11. The method of claim 10 further characterized in that the mixture of polyols comprises a polyoxypropylene derivative of pentaerythritol possessing a hydroxy number of 555, a polyoxypropylene derivative of pentaerythritol possessing a hydroxy number of 380, an aromatic-based polyoxypropylene derivative of propylene glycol possessing a hydroxy number of 390 and 1,4-butanediol possessing a hydroxy number of 1250.

12. The method of claim 10 further characterized in that the mixture of polyols comprises a polyoxypropylene derivative of pentaerythritol possessing a hydroxy number of 555, a polyoxypropylene derivative of pentaerythritol possessing a hydroxy number of 380, an aromatic-based polyoxypropylene derivative of propylene glycol possessing a hydroxy number of 390 and a polyoxypropylene derivative of trimethylol-propane possessing a hydroxy number of 230.

* * * * *